US010552487B2

(12) United States Patent
Bastide et al.

(10) Patent No.: US 10,552,487 B2
(45) Date of Patent: Feb. 4, 2020

(54) CONVERSATION PURPOSE-BASED TEAM ANALYTICS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/482,972

(22) Filed: Apr. 10, 2017

(65) Prior Publication Data
US 2017/0249397 A1    Aug. 31, 2017

Related U.S. Application Data

(63) Continuation of application No. 15/055,849, filed on Feb. 29, 2016.

(51) Int. Cl.
| | | |
|---|---|---|
| *H04L 29/08* | (2006.01) | |
| *G06F 16/901* | (2019.01) | |
| *G06F 16/9535* | (2019.01) | |
| *H04L 12/58* | (2006.01) | |

(52) U.S. Cl.
CPC ...... *G06F 16/9024* (2019.01); *G06F 16/9535* (2019.01); *H04L 51/04* (2013.01); *H04L 51/22* (2013.01); *H04L 67/1095* (2013.01)

(58) Field of Classification Search
None
See application file for complete search history.

(56) References Cited

U.S. PATENT DOCUMENTS

| | | |
|---|---|---|
| 7,503,007 B2 | 3/2009 | Goodman |
| 7,512,612 B1 | 3/2009 | Akella et al. |
| 7,636,713 B2 | 12/2009 | Jadhav |
| 7,685,016 B2 | 3/2010 | Flores et al. |
| 8,271,598 B2 | 9/2012 | Guy et al. |
| 9,071,567 B2 | 6/2015 | Carrer et al. |
| 2003/0139902 A1 | 7/2003 | Geib et al. |
| 2005/0256949 A1 | 11/2005 | Gruhl |

(Continued)

OTHER PUBLICATIONS

Hansen, D. L. et al. Analyzing Social Media Networks with NodeXL: Insights from a Connected World. Burlington, MA, Elsevier, 2011. p. 105-125. ISBN 978-0-12-382229-1.*

(Continued)

*Primary Examiner* — Esther B. Henderson
*Assistant Examiner* — Dae Kim
(74) *Attorney, Agent, or Firm* — Michael O'Keefe (57) ABSTRACT

A method for generating a context graph is presented. The method may include extracting a plurality of message details from a message. The method may further include determining a message subject based on the plurality of extracted message details. The method may also include identifying a seed graph based on the determined message subject. The method may further include retrieving a plurality of addressee data based on the plurality of extracted message details. The method may also include creating a context graph using the identified seed graph and the plurality of retrieved addressee data.

16 Claims, 6 Drawing Sheets

(56) References Cited

U.S. PATENT DOCUMENTS

| | | | |
|---|---|---|---|
| 2008/0140655 A1 | 6/2008 | Hoos | |
| 2010/0076989 A1 | 3/2010 | Rueben | |
| 2010/0082695 A1* | 4/2010 | Hardt | G06F 17/30893 707/798 |
| 2010/0121849 A1 | 5/2010 | Goeldi | |
| 2010/0169134 A1 | 7/2010 | Cheng et al. | |
| 2010/0192162 A1 | 7/2010 | Conner et al. | |
| 2011/0119388 A1 | 5/2011 | Attanasio | |
| 2012/0030194 A1 | 2/2012 | Jain | |
| 2013/0018955 A1 | 1/2013 | Thaxton et al. | |
| 2013/0124447 A1* | 5/2013 | Badros | G06Q 50/01 706/52 |
| 2013/0124538 A1* | 5/2013 | Lee | G06F 17/3053 707/749 |
| 2013/0151429 A1 | 6/2013 | Cao et al. | |
| 2013/0159425 A1 | 6/2013 | Hogan et al. | |
| 2013/0275429 A1 | 10/2013 | York et al. | |
| 2013/0287187 A1* | 10/2013 | Gandhe | H04M 3/42042 379/93.17 |
| 2014/0032659 A1* | 1/2014 | Marini | H04L 51/32 709/204 |
| 2014/0343936 A1 | 11/2014 | Thapar | |
| 2014/0344709 A1 | 11/2014 | Roberts | |
| 2015/0269155 A1 | 9/2015 | Bastide et al. | |
| 2017/0039246 A1 | 2/2017 | Bastide et al. | |
| 2017/0039296 A1 | 2/2017 | Bastide et al. | |

OTHER PUBLICATIONS

Roth et al. "Suggesting (More) Friends Using the Implicit Social Graph", Proceedings of the 28th Int'l Conference on Machine Learning, 2011 [retrieved on Mar. 15, 2019]. Retrieved from the Internet: <URL: http://www.icml-2011.org/papers/X6_crossconference. pdf>. (Year: 2011).*

MacLean et al. "Groups Without Tears: Mining Social Topologies from Email", IUI 2011, Feb. 13, 2011 [retrieved on Sep. 13, 2019]. Retrieved from the Internet: <URL: https://mobisocial.stanford.edu/papers/iui11.pdf>. (Year: 2011).*

Laclavik et al. "Email Analysis and Information Extraction for Enterprise Benefit", Computing and Informatics, vol. 30, 2011, pp. 57-87 [retrieved on Sep. 13, 2019]. Retrieved from the Internet: <URL: https://pdfs.semanticscholar.org/e14f/f648bc07d4c991f069cfb6eeb30bd30bf08b.pdf>. (Year: 2011).*

IBM: List of IBM Patents or Patent Applications Treated as Related (Appendix P), Apr. 12, 2017, pp. 1-2.

Bastide, et al., Pending U.S. Appl. No. 15/055,849, filed Feb. 29, 2016, titled "Conversation Purpose-Based Team Analytics", pp. 1-40.

Chen, "Topic Identification in Discourse," Proceedings of the Seventh Conference of the European Chapter of the Association for Computational Linguistics (EACL '95), 1995, p. 267-271.

Elbourn et al., "Social Recommendations API," IBM Connections Developers for Cloud: API Reference, Last Modified on Jun. 30, 2015, p. 1-3, https://www-10.lotus.com/ldd/appdevwiki.nsf/xpAPIViewer.xsp?lookupName=API+Reference#action=openDocument&res_title=Social_Recommendations_API_ic50&content=apicontent, Accessed on Feb. 24, 2016.

Fairbanks et al., "IBM RAVE—Rapidly Adaptive Visualization Engine," Cognos User Group Discussion, Apr. 24, 2014, 28 Pages, Convergence Consulting Group.

IBM, "Advanced Analytics," IBM Analytics, p. 1-2, http://www.ibm.com/analytics/us/en/technology/advanced-analytics/index.html, Accessed on Feb. 24, 2016.

IBM, "Analyzing survey text: a brief overview," IBM Business Analytics Software, May 2010, p. 1-11, IBM Corporation.

IBM, "Download SwiftFile Mail Assistant for Notes Client 8.x," IBM Support, Last Modified on Jun. 24, 2008, p. 1-2, http://www-01.ibm.com/support/docview.wss?uid=swg24019219, Accessed on Feb. 24, 2016.

IBM, "IBM SPSS Statistics Editions," IBM Business Analytics Software, Apr. 2013, p. 1-7, IBM Corporation.

IBM, "Searching for a Person's Report-To Chain," IBM Knowledge Center, p. 1-5, IBM Lotus Connections 2.5, http://www.http://www-01.ibm.com/support/knowledgecenter/SSYGQH_2.5.0/com.ibm.connections.25.help/r_api_prof_get_mgr_profile.html, Accessed on Feb. 24, 2016.

Maclean et al., "Groups Without Tears: Mining Social Topologies from Email," IUI 2011, Feb. 13-16, 2011, p. 83-92, ACM, Palo Alto, California, USA.

Mell et al., "The NIST Definition of Cloud Computing," National Institute of Standards and Technology, Sep. 2011, p. 1-3, Special Publication 800-145.

Reed, "Facebook Looks to Improve News Feed Content Quality," Marketing Pilgrim, Aug. 26, 2013, p. 1-4, http://www.marketingpilgrim.com/2013/08/facebook-looks-to-improve-news-feed-content-quality.html, Accessed on Feb. 24, 2016.

Rohall et al., "ReMail: A Reinvented Email Prototype," CHI 2004, Apr. 24-29, 2004, p. 791-792, ACM, Vienna, Austria.

SaneBox, "SaneBox for Business," SaneBox Product, p. 1-3, https://www.sanebox.com/business, Accessed on Feb. 24, 2016.

Tarbaj, "Understanding Facebook's EdgeRank," Social Media Today, Feb. 2, 2013, p. 1-6, http://www.socialmediatoday.com/content/understanding-facebooks-edgerank, Accessed on Feb. 24, 2016.

Timothy et al., "Facebook Launches Advanced AI Effort to Find Meaning in Your Posts," Slashdot, Sep. 21, 2013, p. 1-12, SlashdotMedia, http://tech.slashdot.org/story/13/09/21/1831239/facebook-launches-advanced-ai-effort-to-find-meaning-in-your-posts, Accessed on Feb. 24, 2016.

Trindaz et al., "How can I parse email text for components like <salutation><body><signature><reply text> etc?," Stack Overflow—python, May 17, 2011, p. 1-2, Stack Exchange Inc., http://stackoverflow.com/questions/6025184/how-can-i-parse-email-text-for-components-like-salutationbodysignaturerep, Accessed on Feb. 24, 2016.

Wikipedia, "Deep Learning," Wikipedia: the Free Encyclopedia, Last Modified on Feb. 24, 2016, p. 1-31, https://en.wikipedia.org/wiki/Deep_learning, Accessed on Feb. 24, 2016.

Wikipedia, "Graph Theory," Wikipedia: the Free Encyclopedia, Last Modified on Feb. 18, 2016, p. 1-11, https://en.wikipedia.org/wiki/Graph_theory, Accessed on Feb. 24, 2016.

Wikipedia, "Natural Language Processing," Wikipedia: the Free Encyclopedia, Last Modified on Feb. 19, 2016, p. 1-10, http://en.wikipedia.org/wiki/Natural_language_processing, Accessed on Feb. 24, 2016.

Dom, "Graph-Based Ranking Algorithms for E-mail Expertise Analysis"; ACM; 2003; pp. 1-7.

IBM Corporation; "IBM SPSS Statistics: What's New," IBM Software Business Analytics, 2015, pp. 1-8.

IBM; "Personal Cognitive Assistant for Meetings," IBM ifundIT, 2015, pp. 1-3.

IBM; "Social Recommendations API," IBM Connections Developers for Cloud: API Reference, Downloaded from the 16 Internet on Aug. 14, 2015, pp. 1-5 (http://www-10.lotus.com/ldd/appdevwiki.nsf/xpAPIViewer.xsp?lookupName=API+Reference#action=open•ocument&res_title=Social_Recommendations_API_ic50&content=apicontent>.

IBM; "Swiftfile 4.2 for IBM Notes 9.0: Installation and Usage Instructions," 2013, pp. 1-3.

IBM; "The IBM Rapidly Adaptive Visualization Engine Overview," pp. 1-3.

Marketing Pilgrim; "Facebaak Looks to Improve News Feed Content Quality," Downloaded from the Internet on 2 Aug. 12, 2015, pp. 1-7, <http://www.marketingpilgrim.com/2013/08/facebook-looks-to-imprave-news-feed-content . . . >.

SaneBox, "Email Overload in the Enterprise: The science behind email productivity," Sanebox.com, No Publication date, pp. 1-8.

SaneBox; "Your Email Without SaneBox," Downloaded from the Internet on Jul. 2, 2015, pp. 1-10 <http://www.sanebox.com/I/how-it-works#sthash.hEqocKRM.SmV6aodi.dpbs>.

Slashdot; "Facebook Launches Advanced AI Effort to Find Meaning in Your Pasts," Downloaded from the Internet an Aug. 12, 2015, pp. 1-17, <http://tech.slashdat.org/stary/13/09/21 /1831239/facebaak-launches-advanced-aieffart-ta-find-meanin>.

(56) References Cited

OTHER PUBLICATIONS

SOCIALMEDIATODAY; Understanding Facebook EdgeRank [Infographic], Downloaded from the Internet on Aug. 13, 2015, pp. 1-8, <http://www.socialmediatoday.com/content/understanding-facebook-edgerank-infographic>.

* cited by examiner

CONVERSATION PURPOSE-BASED TEAM ANALYTICS

BACKGROUND

The present invention relates generally to the field of computing, and more particularly to analytics.

Analytics relates to the identification and communication of useful data patterns. Analytics utilizes statistics, computer programming, and operations research to determine meaningful data patterns and quantify the performance of those data patterns. Furthermore, analytics is frequently used with respect to business data to aid in the prediction of future business performance. Insights discovered through the use of analytics may be used to recommend future actions or guide business decisions.

SUMMARY

According to one embodiment, a method for generating a context graph. The method may include extracting a plurality of message details from a message. The method may further include determining a message subject based on the plurality of extracted message details. The method may also include identifying a seed graph based on the determined message subject. The method may further include retrieving a plurality of addressee data based on the plurality of extracted message details. The method may also include creating a context graph using the identified seed graph and the plurality of retrieved addressee data.

According to another embodiment, a computer system for generating a context graph. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include extracting a plurality of message details from a message. The computer system may further include determining a message subject based on the plurality of extracted message details. The computer system may also include identifying a seed graph based on the determined message subject. The computer system may further include retrieving a plurality of addressee data based on the plurality of extracted message details. The computer system may also include creating a context graph using the identified seed graph and the plurality of retrieved addressee data.

According to yet another embodiment, a computer program product for generating a context graph. The computer program product may include one or more computer-readable storage devices and program instructions stored on at least one of the one or more tangible storage devices, the program instructions executable by a processor. The computer program product may include program instructions to extract a plurality of message details from a message. The computer program product may further include program instructions to determine a message subject based on the plurality of extracted message details. The computer program product may also include program instructions to identify a seed graph based on the determined message subject. The computer program product may further include program instructions to retrieve a plurality of addressee data based on the plurality of extracted message details. The computer program product may also include program instructions to create a context graph using the identified seed graph and the plurality of retrieved addressee data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to analytics. The following described exemplary embodiments provide a system, method, and program product to, among other things, utilize analytics to create a context graph of message addressee relationships based on message recipient information and message context. More specifically, the created context graph may establish a consistent graph style based on the message purpose and enhance the usefulness of the context graph to improve user workflow.

As previously described, analytics relates to the identification and communication of useful data patterns. Analytics utilizes statistics, computer programming, and operations research to determine meaningful data patterns and quantify the performance of those data patterns. Furthermore, analytics is frequently used with respect to business data to aid in the prediction of future business performance. Insights discovered through the use of analytics may be used to recommend future actions or guide business decisions.

Many computer-implemented platforms connect people and information in logical and organized manners, which enable sharing and processing information between users. Some of the most common platforms that allow information sharing and processing include an email inbox, a social media wall, an activity stream, a social media timeline, and a user's social media profile. These mechanisms enable users to rapidly share information with and gather information from other individuals within the connecting network. Furthermore, each user may create, read, and respond to a vast number of messages each day, thereby, decreasing productivity while establishing context for messages. Analytics can be used to prepare and manipulate data received and processed through computer systems, such as mail clients and online social networks, to organize and connect otherwise isolated data items.

Cloud-based networking applications, such as IBM Verse™ (IBM Verse and all IBM Verse-based trademarks and logos are trademarks or registered trademarks of International Business Machines Corporation and/or its affiliates), may be designed for both internet and mobile application use by blending elements of email, instant messaging, calendar events, video chat, and social media networking into a single solution. Furthermore, cloud-based networking applications may allow users to focus on personal top priorities, find and share content, establish context, and control action items. Additionally, cloud-based email clients may allow users to tune-in/tune-out messages, identify data using specialized facets, and features a modern, state-of-the-art web interface.

Data analytics features, such as the team analytics function within IBM Verse™, may allow for quickly establishing context within messages and increase individual productivity. For example, an analytics feature within an email client may be capable of creating a context graph to aid user understanding of how each addressee to a message or conversation is connected to the other addressees. To create such context graphs, information relating to the users involved in a conversation or message is extracted and used to populate the context graph that establishes direct and indirect connections between addressees. Therefore, the analytics features of cloud-based networking applications allow for the quick creation of a graph that aids in establishing context for messages and conversations. For example, if Alice, Bob, Nancy, and Eve utilize IBM Verse™ as an email client, Eve may send Alice a new email message titled, "Crit Sit A," relating to a critical situation. The email message may include an earlier exchange between Bob, Nancy, and Eve. If IBM Verse™ sets a limit of two users in a graph, when Alice opens the received email message, Alice may see that Bob and Nancy are connected in the organizational structure through a context graph. However, Alice may not be able to determine how Eve is connected to the other users in the message (i.e. Bob and Nancy), since Eve is not included in the context graph. Therefore, Alice is missing relevant details to establish a useful context for the email message, such as Eve's relationship to the other individuals in the message and, if Eve is in a different department than Bob and Nancy, the department to which the critical situation relates.

However, analytics features within cloud-based networking applications do not necessarily show the most useful context graph. For messages or conversations that contain a large number of addressees or for large organizations that rely on email as the primary communications medium, the team analytics function may not speed up execution. Furthermore, an individual copied or otherwise included on a message or conversation may not be an important member of the conversation. For example, if company employee Alice is communicating with customer Bob about a sales opportunity, Alice may copy her manager, Nancy, on the email when a formal price is offered based on company policy. Since Nancy is not necessarily contributing in any manner to the conversation between Alice and Bob, her inclusion in the context graph may not be necessary.

Furthermore, some email exchanges may have a typical number and type of individuals included. The omission of an individual may be damaging to the purpose of conversation. For example, if a customer is having a technical issue with a purchased product, the customer may contact the manufacturer to have the issue resolved. Under such circumstances, a customer service representative may start an email conversation and, typically, include the customer, the sales representative responsible for selling the product to the customer, a manager, an engineer, and a system architect. However, due to any number of factors, the email drafter may omit one or more individuals from the conversation. For example, the customer service representative may accidentally omit the system architect from the conversation. If an individual is omitted from an email conversation, the context graph created using the analytics features of a networking application may not provide adequate context to the message or conversation. As such, it may be advantageous, among other things, to implement a system that dynamically extracts related addressee information from a received message to create a context graph in a networking application. Furthermore, data relating to standard types may be extracted from a repository and used in the created context graph to determine if any necessary addressees are omitted from the message or conversation.

According to one embodiment, an analytics feature within a networking application, such as an email client or a social networking application, may create a context graph showing the relationships of the message addressees by extracting message details, such as the message purpose and addressee details, from the message body to enhance user understanding of a received message. The addressee details extracted from the received message may include department the addressee belongs to, the addressee's position title, and relationships between message addressees. Furthermore, a seed graph may be created and mapped using the extracted message details resulting in a linked context graph that displays the relationships of message addressees.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that generates a context graph using extracted message details that delineate user information and message purpose information included within a message or a conversation in a networking application. Furthermore, the context graph generation system may create the context graph by mapping the message purpose to a seed graph, retrieving relationship information for each addressee, and populating the context graph based on the seed graph and the retrieved relationship information.

Figure 1:
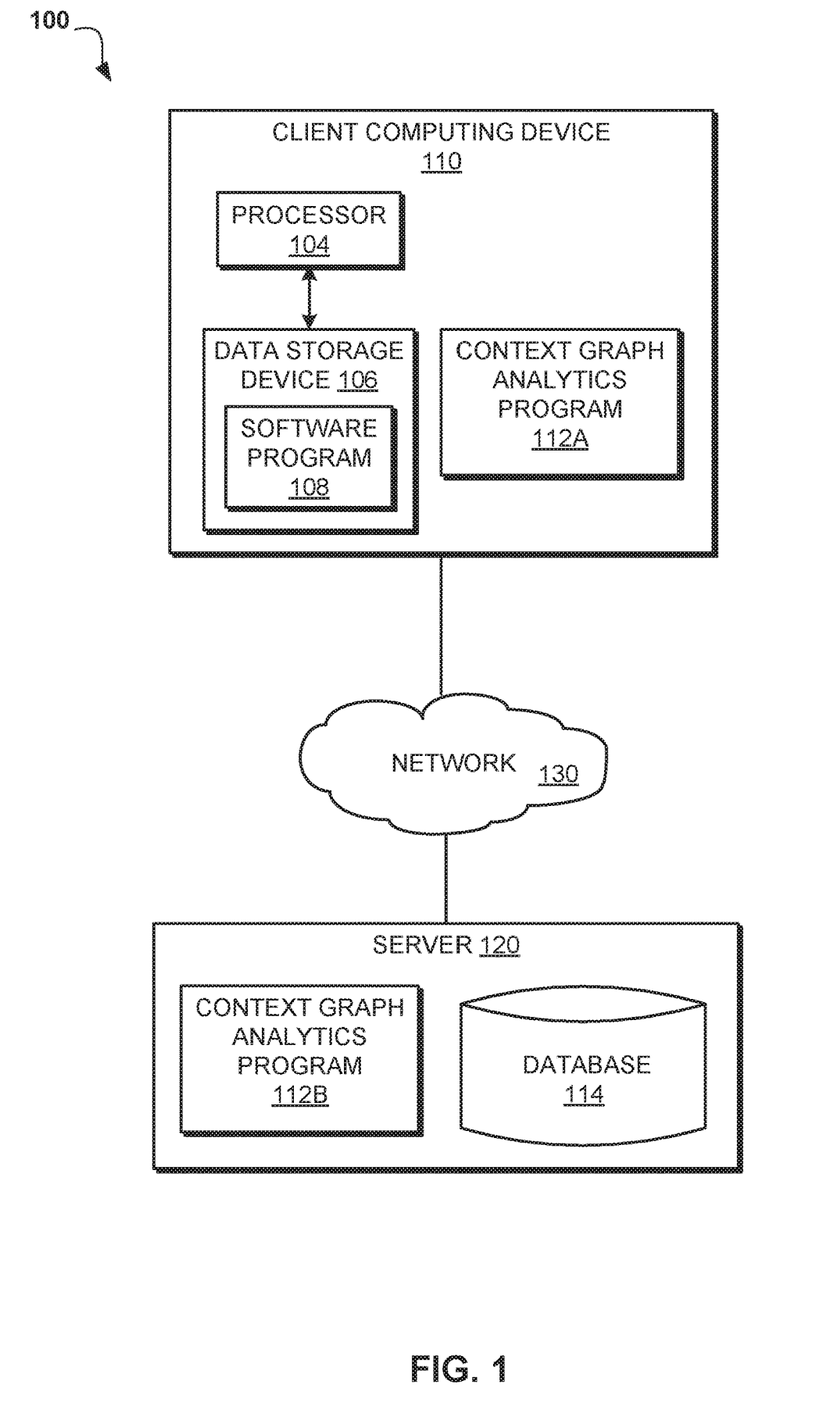
FIG. 1 is an exemplary networked computer environment, in accordance with one embodiment of the present invention.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108 and a Context Graph Analytics Program 112A and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 110 may include internal components 502a and external components 504a, respectively.

The server computer 120 may be a laptop computer, netbook computer, personal computer (PC), a desktop computer, or any programmable electronic device capable of hosting a Context Graph Analytics Program 112B and a data repository, such as database 114, and communicating with the client computing device 110 via the communication network 130, in accordance with embodiments of the invention. As will be discussed with reference to FIG. 5, the server computer 120 may include internal components 502b and external components 504b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the Context Graph Analytics Program 112A, 112B may be a program capable of creating a context graph using user message details. The Context Graph Analytics Program 112A, 112B may also be capable of extracting user message details, such as the purpose of a message, body text, and message addressees, from a message or conversation in a messaging client, such as IBM Verse™. Furthermore, the Context Graph Analytics Program 112A, 112B may include a repository, such as a database or a lookup table, of seed graphs. A seed graph may relate to a pre-generated, unpopulated graph of independent elements relating to a specific message subject based on likely individuals that would communicate on a networking client about the specific message subject. The Context Graph Analytics Program 112A, 112B is explained in further detail below with respect to FIG. 2.

Figure 2:
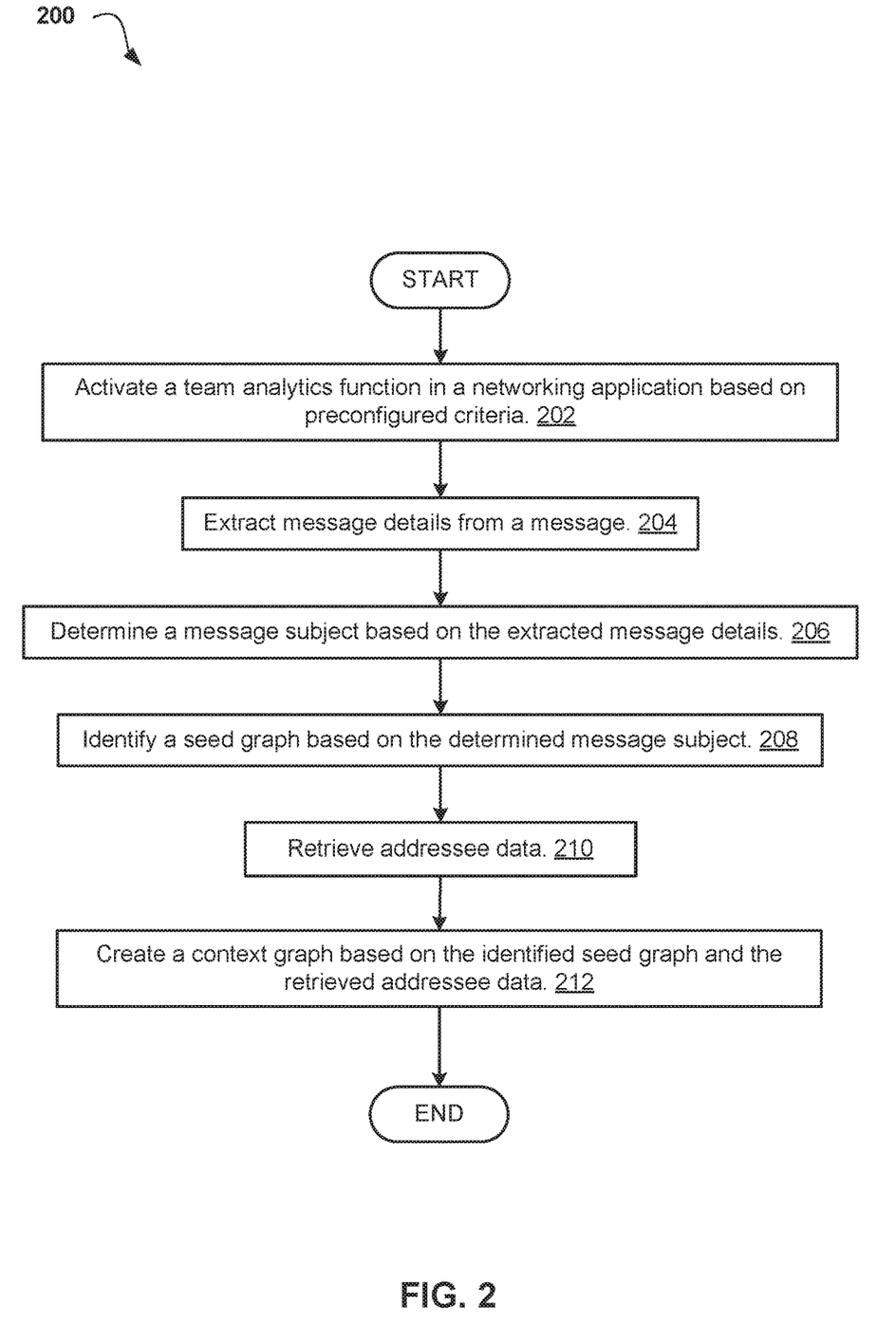
FIG. 2 illustrates an operational flowchart of the steps carried out by a Context Graph Analytics Program, in accordance with one embodiment of the present invention.

Referring now to FIG. 2, an operational flowchart 200 of the steps carried out by a Context Graph Analytics Program 112A, 112B (FIG. 1) is depicted, in accordance with one embodiment of the present invention. At 202, the Context Graph Analytics Program 112A, 112B (FIG. 1) activates a team analytics function in a networking application based on preconfigured criteria. The Context Graph Analytics Program 112A, 112B (FIG. 1) may be implemented with networking applications, such as email systems, social networking systems (e.g. asynchronous networks and synchronous networks), instant messaging systems, and Wikis, that utilize a team analytics function. Networking applications may include user collaboration data associated with the application, such as authors, editors, readers, and followers, which report to chains surrounding each social object. The team analytics function of a networking application may be a feature that aids in user understanding of the context of a message or conversation within the networking application by graphing the participants in or contributors to the conversation or message. Furthermore, the team analytics function may aid a user in completing a secondary task, such as drafting an email, in the shortest period of time so the user may continue a primary task, such as target job responsibility. To utilize the team analytics function, the Context Graph Analytics Program 112A, 112B (FIG. 1) may be required to activate the team analytics function within the networking application. The Context Graph Analytics Program 112A, 112B (FIG. 1) may manually activate the team analytics function of the social collaboration system through user interaction on a graphical user interface. For example, the user may click on an icon or a menu to initiate the team analytics function of the networking application.

In another embodiment, the Context Graph Analytics Program 112A, 112B (FIG. 1) may automatically activate the team analytics function of the networking application when user predefined criteria are satisfied, such as the user's familiarity with addressees. For example, if number of addressees a user has never communicated with before or are unknown to the user exceeds a preconfigured threshold value, the Context Graph Analytics Program 112A, 112B (FIG. 1) may activate the team analytics function of the networking application.

Next at 204, the Context Graph Analytics Program 112A, 112B (FIG. 1) extracts message details from a message or conversation. The Context Graph Analytics Program 112A, 112B (FIG. 1) may use standard text extraction technology to extract the message details. The message details extracted by the Context Graph Analytics Program 112A, 112B (FIG. 1) may include specific message field information for the current conversation session in a networking application, such as the subject field, the message body field, the "TO:" field, the carbon copy field, the blind carbon copy field, the domain list, a distribution list, and an attachment field within the current and prior sent messages. The specific message field information related to the domain list may include all users of a website or a networking application. The extracted message details may be utilized by the Context Graph Analytics Program 112A, 112B (FIG. 1) to determine the addresses to the message or conversation.

Additionally, the Context Graph Analytics Program 112A, 112B (FIG. 1) may be capable of expanding any groups that hide all of the addressees, such as distribution lists, so that each user is appropriately represented. For example, if a distribution list is the addressee in the "TO:" field, the Context Graph Analytics Program 112A, 112B (FIG. 1) may expand the distribution list so that each addressee is shown and may be extracted. For example, if an email was sent to a department distribution list, with Alice and Bob included by carbon copy and Eve included by blind carbon copy, the Context Graph Analytics Program 112A, 112B (FIG. 1) may extract all individuals within the distribution list, Alice, Bob, and Eve as current addressees for the email. Furthermore, based on the relevant features of groups from which the Context Graph Analytics Program 112A, 112B (FIG. 1) extracts message details, the Context Graph Analytics Program 112A, 112B (FIG. 1) may include analysis of the group membership or ownership. In another embodiment, the Context Graph Analytics Program 112A, 112B (FIG. 1) may treat groups as individual entities during the extraction process.

Then at 206, the Context Graph Analytics Program 112A, 112B (FIG. 1) determines the message subject, or purpose, based on the extracted message details. Using the text from the extracted message details, the Context Graph Analytics Program 112A, 112B (FIG. 1) may determine the message subject. The message subject may be a context describing the entire message, part of the message, or a combination with the message metadata. Utilizing typical text analytics models and natural language processing techniques, the Context Graph Analytics Program 112A, 112B (FIG. 1) may perform a context analysis of the text within each paragraph of the extracted message body to determine which subject or subjects apply to each paragraph and the message text as a whole. Since the subject listed within the subject field of a message may be different than the subject described within the message body, the Context Graph Analytics Program 112A, 112B (FIG. 1) may analyze the message body for the message subject. For example, the Context Graph Analytics Program 112A, 112B (FIG. 1) may determine the subject of the message text is a technical support issue even though the user-entered subject in the subject field may be related to customer dissatisfaction with a software product.

Additionally, when conducting the context analysis, the Context Graph Analytics Program 112A, 112B (FIG. 1) may remove portions of the message text so that only applicable text and references within the text are considered in accordance with the extracted message detail information. For example, if the Context Graph Analytics Program 112A, 112B (FIG. 1) an email conversation includes all prior emails exchanged between addresses but those prior emails are not important in regards to the discussion in the most recent email, the Context Graph Analytics Program 112A, 112B (FIG. 1) may remove the text of the prior emails when conducting a context analysis. Furthermore, the Context Graph Analytics Program 112A, 112B (FIG. 1) may omit duplicative information. For example, if a user's signature line information is included in each email exchange, the Context Graph Analytics Program 112A, 112B (FIG. 1) may remove all but one instance of the user's signature line information. Additionally, the Context Graph Analytics Program 112A, 112B (FIG. 1) may remove or omit any ancillary information, such as a salutation or greeting, so only information relevant to the purpose of the conversation is analyzed.

If the information provided within the current message or conversation is incomplete, the Context Graph Analytics Program 112A, 112B (FIG. 1) may utilize available user personal data, user social data, and user organizational data. For example, if an email conversation contains incomplete data to extract the message field information or perform the context analysis, the Context Graph Analytics Program 112A, 112B (FIG. 1) may expand the dataset by analyzing other emails within the user's inbox. Similarly, if the incomplete message or conversation is from a social network, the Context Graph Analytics Program 112A, 112B (FIG. 1) may utilize any social or public data available on the user's social media network. Furthermore, the data used to supplement an incomplete message or conversation may be retrieved from an account associated with any addressee to the message. Additionally, the user personal data may include user signature line information and other user information implied from within the extracted message body, such as the user's position or role, company of employment, department name, telephone number, fax number, email address, and social networking profile name. The user social data may include information available on the user's social media network, such as contact information, social network contacts, and user preferences. The user organizational data may include information relevant to the user's organization, such as organization name, department name, organization purpose, and organization size. Furthermore, the Context Graph Analytics Program 112A, 112B (FIG. 1) may determine addressee information based on direct text or inferences within the extracted message body. For example, an instant message with the text "@Alice, can you mentor Bob?" may be sent to Alice from Eve. The Context Graph Analytics Program 112A, 112B (FIG. 1) may infer from the message body that a role associated with Alice is being a mentor for Bob.

Next at 208, the Context Graph Analytics Program 112A, 112B (FIG. 1) identifies a seed graph using the determined message subject. As previously described, the Context Graph Analytics Program 112A, 112B (FIG. 1) may include a repository, such as a database or a lookup table, of seed graphs. A seed graph may relate to a pre-generated, unpopulated graph of independent elements relating to a specific message subject based on likely individuals that would communicate on a networking client about the specific message subject. Keywords or tags may be associated with each seed graph depending on the message subject to which each seed graph relates. For example, if a seed graph relates to a customer technical issue, the seed graph may include independent, unconnected graph elements for a customer, a manager, an architect, and an engineer, since these individuals would likely communicate together about the customer technical issue. Additionally, each seed graph may be stored with accompanying natural language descriptions or hints as to each seed graph element's purpose. For example, if a manager's purpose within the seed graph is to approve the engineer's work, such language may be included within the seed graph data.

Once the subject or purpose of the message is determined, the Context Graph Analytics Program 112A, 112B (FIG. 1) may search the repository to identify the seed graph that most appropriately fits to the keywords within the determined message subject. For example, if the determined message subject relates to a technical support issue, the Context Graph Analytics Program 112A, 112B (FIG. 1) may determine that the previously described seed graph relating to a customer support issue is a most appropriate fit. Therefore, the Context Graph Analytics Program 112A, 112B (FIG. 1) may identify the customer technical issue seed graph as the seed graph to populate using the extracted message details.

Additionally, the Context Graph Analytics Program 112A, 112B (FIG. 1) may optimize seed graphs based on feedback of existing models, such as user likes and dislikes of existing seed graphs. Furthermore, each seed graph may establish a limited cardinality for outbound edges. For example, a seed graph may be preconfigured so that only one manager is listed regardless of how many managers may be included as addressees within an email. Additionally, the Context Graph Analytics Program 112A, 112B (FIG. 1) may prepare a next step seed graph based on the status of the implied workflow in the conversation. The next step seed graph may represent the next individuals a user should include in a subsequent message based on the preceding message or messages. For example, an email chain may include a conversation between a customer, an engineer, and a sales representative. The Context Graph Analytics Program 112A, 112B (FIG. 1) may be able to determine from an email chain that the next seed graph the user may need would involve the customer, the engineer, the sales representative, an architect, and a manager.

In one embodiment, the Context Graph Analytics Program 112A, 112B (FIG. 1) may create each seed graph for storage in the repository based on data accumulated from a user message or conversation within the current networking application or another networking application associated with the user. For example, if the Context Graph Analytics Program 112A, 112B (FIG. 1) isn't able to make a full context determination using the data extracted from the message or conversation, the Context Graph Analytics Program 112A, 112B (FIG. 1) may analyze other messages or conversations within the user's email inbox or social media feed to supplement the partially determined context.

Then at 210, the Context Graph Analytics Program 112A, 112B (FIG. 1) retrieves addressee data. The Context Graph Analytics Program 112A, 112B (FIG. 1) may retrieve addressee data for each addressee within the extracted message details. The Context Graph Analytics Program 112A, 112B (FIG. 1) may retrieve the addressee data by extracting details from a profile system, such as a social network or a corporate employee directory, using a social path application programming interface (API). The retrieved addressee data may include addressee relationships, reporting structure data, and profile data.

Reporting structure data may detail a reporting structure or reporting tree for an organization. For example, if Eric is included within a message, the reporting structure data may detail that Eric reports to Debby, Debby reports to Fred, and Fred reports to Pam. Similarly, the same reporting structure data may illustrate that Paul, also included within the message, reports to Bob, and Bob reports to Fred. Therefore, the reporting structure data illustrates how Eric and Paul are related in the organizational structure in that they share a common second line manager in Fred. The reporting structure data may be retrieved after individual roles are mapped to the seed graph.

Furthermore, the Context Graph Analytics Program 112A, 112B (FIG. 1) may retrieve the profile data for each addressee using a profile-based API. The profile data for each addressee may include contexts, current employee roles, employee job titles, and prior authored updates or user generated content. For example, if Bob is included as an addressee to an email message, the Context Graph Analytics Program 112A, 112B (FIG. 1) may be able to determine that Bob is a manager based on his profile information on a social media network.

Next at 212, the Context Graph Analytics Program 112A, 112B (FIG. 1) creates a context graph based on the seed graph and the retrieved addressee data. The Context Graph Analytics Program 112A, 112B (FIG. 1) may map the best, or most appropriate, user to the seed graph. For example, if Bob spoke the most during an email exchange or group chat and is also the organization manager, Bob should be added to the seed graph in the manager element. If the seed graph is not entirely representative of all the addressees within a message, the Context Graph Analytics Program 112A, 112B (FIG. 1) may add more users to the seed graph and place the seed graph users at specific locations within the graph based on each individual's relationship. For example, if there are two engineers included as addressees in an email message but the seed graph only includes one engineer, the Context Graph Analytics Program 112A, 112B (FIG. 1) may add a second element within the engineer category and populate it with the retrieved addressee data for the second engineer addressee.

Furthermore, the Context Graph Analytics Program 112A, 112B (FIG. 1) may implement various display features within the context graph including animating the lines between users to show the progressive flow of messages from the initiator of the conversation, using multiple edges within the context graph, presenting fragments of the context graph when no links can be created, utilizing horizontal or vertical paging of the context graph, presenting the graph in a vertical or horizontal layout, enabling a hover-over feature for each element to allow the display of business card data, and varying the richness of the context graph based on software performance or user subject familiarity. Additionally, the Context Graph Analytics Program 112A, 112B (FIG. 1) may augment the edges of the graph with the roles of each individual as identified in the retrieved addressee data. For example, if Alice is a customer, the customer element within the seed graph may be augmented to indicate that Alice fits this role. Furthermore, when creating connection lines between users, the Context Graph Analytics Program 112A, 112B (FIG. 1) may increase or decrease the line weight of the line connections between graph elements based on the amount of messages, replies, or comments sent between users either in total or per conversation. Additionally, the Context Graph Analytics Program 112A, 112B (FIG. 1) may display the context graph in a pop-up window, in-line to the content, or broken out into a new window.

The Context Graph Analytics Program 112A, 112B (FIG. 1) may also utilize various processing features when creating the context graph, such as implementing a feedback loop, caching the content, work, and results to avoid duplication of steps, ignoring user names with no attached management information, present a warning when no graph data is available for presentation for a particular user, enabling users to select a preferred context graph for each user or conversation rather than using auto-selection of a best fit seed graph to create the context graph, highlighting anti-patterns where anti-seed graphs are found, and analyzing patterns and relationships of the users within the graph to determine how engaged each user should be in the conversation based on each user's role and/or the purpose of the conversation. Anti-patterns may relate to possible negative situations present within a message or conversation. For example, if a department supervisor is included in an email chain, a user may wish to have that individual highlighted or otherwise noted.

Additionally, the Context Graph Analytics Program 112A, 112B (FIG. 1) may establish a threshold on the context graph size. The Context Graph Analytics Program 112A, 112B (FIG. 1) may set a limit on the social distance returned per user. For example, the context graph may only display users within four connections of the displayed user. When gaps are present in finding a person to seed the graph, the Context Graph Analytics Program 112A, 112B (FIG. 1) may suggest a person to be added to complete the context graph.

Furthermore, the Context Graph Analytics Program 112A, 112B (FIG. 1) may present a unique graph based on user preferences. In another embodiment, the Context Graph Analytics Program 112A, 112B (FIG. 1) may present the graph based on a specific user's viewpoint. For example, a software tester may only be concerned with the architect's opinion. Therefore, the graph may be more centered toward the architect's opinion. Similarly, a manager may be more concerned with the customers so a graph created for a manger may favor customer relationships. Additionally, the Context Graph Analytics Program 112A, 112B (FIG. 1) may establish a policy based on the user, organization/department, and company that controls the presentation of the users within the purpose-based context graph.

It may be appreciated that FIG. 2 provides only an illustration of one implementation and does not imply any limitations with regard to how different embodiments may be implemented. Many modifications to the depicted environments may be made based on design and implementation requirements.

Figure 3:
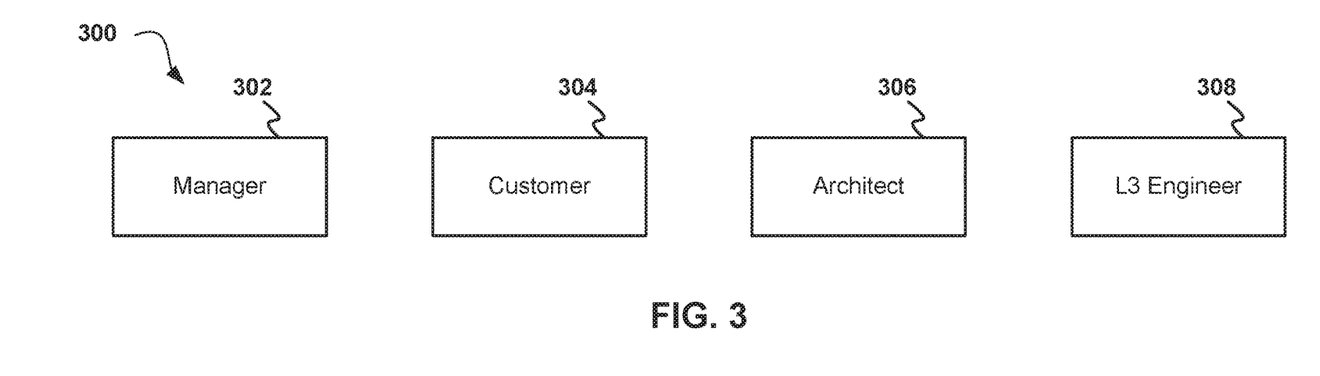
FIG. 3 is a functional block diagram of a seed graph from a received electronic mail message, in accordance with one embodiment of the present invention.

Referring now to FIG. 3, a functional block diagram 300 of a seed graph from a received electronic mail message is depicted, in accordance with one embodiment of the present invention. As previously described, the Context Graph Analytics Program 112A, 112B (FIG. 1) may search a data repository, such as database 114 (FIG. 1), to identify a most appropriate seed graph for a message or conversation. A seed graph may relate to a pre-generated, unpopulated graph of independent elements relating to a specific message subject based on likely individuals that would communicate on a networking client about the specific message subject. For example, a seed graph relating to a customer technical issue may include a manager element 302, a customer element 304, an architect element 306, and an L3 engineer element 308. Therefore, when the Context Graph Analytics Program 112A, 112B (FIG. 1) determines the subject of a message or conversation relates to a customer technical issue, the Context Graph Analytics Program 112A, 112B (FIG. 1) may identify the customer technical issue seed graph within the repository and retrieve the identified seed graph for population with addressee data.

Figure 4:
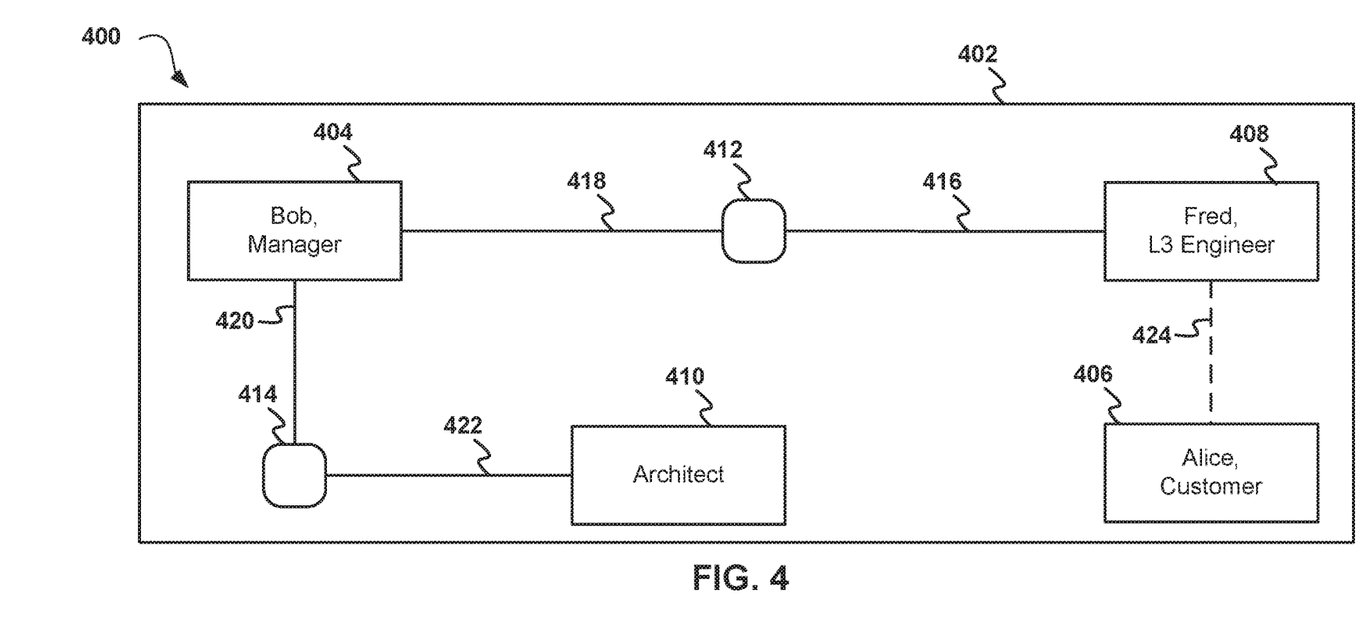
FIG. 4 is a graph functional block diagram of a team analytics graph based on the seed graph from a received electronic mail message, in accordance with one embodiment of the present invention.

Referring now to FIG. 4, a graph functional block diagram 400 of a team analytics graph based on the seed graph from a received electronic mail message is depicted, in accordance with one embodiment of the present invention. Once the Context Graph Analytics Program 112A, 112B (FIG. 1) identifies the seed graph based on the message subject and retrieves the addressee information, the Context Graph Analytics Program 112A, 112B (FIG. 1) may populate the identified seed graph using the retrieved addressee information. In the previously described example relating to the customer technical issue seed graph, a horizontal view context graph 402 may be created that includes a populated manager element 404, a populated customer element 406, a populated engineer element 408, an unpopulated architect element 410, an intermediate node 412, and an ancillary node 414 all connected by connection lines 416-424. The populated manager element 404, populated customer element 406, and the populated engineer element 408 may all include retrieved addressee information relevant to the addressees represented by those elements. The unpopulated architect element 410 may relate to an element that is not attached to any addressee information. An unpopulated element may be present when the Context Graph Analytics Program 112A, 112B (FIG. 1) is unable to identify an addressee within the message or conversation corresponding to an element within the identified seed graph.

The intermediate node 412 may relate to a context graph element for an individual to which the engineer represented in the populated engineer element 408 reports and to which the manager represented in the populated manager element 404 supervises but is not otherwise included within the identified seed graph or within the message or conversation. The ancillary node 414 may relate to a department manager on the same level as the manager represented in the populated manager element 404 who supervises an architect represented within the unpopulated architect element 410.

As previously described, connection lines 416-424 may be utilized to show connections between individuals. The connections may relate to a reporting structure within an organization. If an individual represented in the context graph is not a member of the organization, that individual may be represented with a dotted connection line to an element within the organization or may have no connection lines 416-424 to any other elements 404 and 408-414 within the context graph. For example, the customer represented by the populated customer element 406 is not a member of the organization represented within the context graph 402. Therefore, the populated customer element 406 is connected to the populated engineer element 408 by a dotted connection line since the customer may have been communicating directly with the engineer within the message or conversation analyzed by the Context Graph Analytics Program 112A, 112B (FIG. 1).

Figure 5:
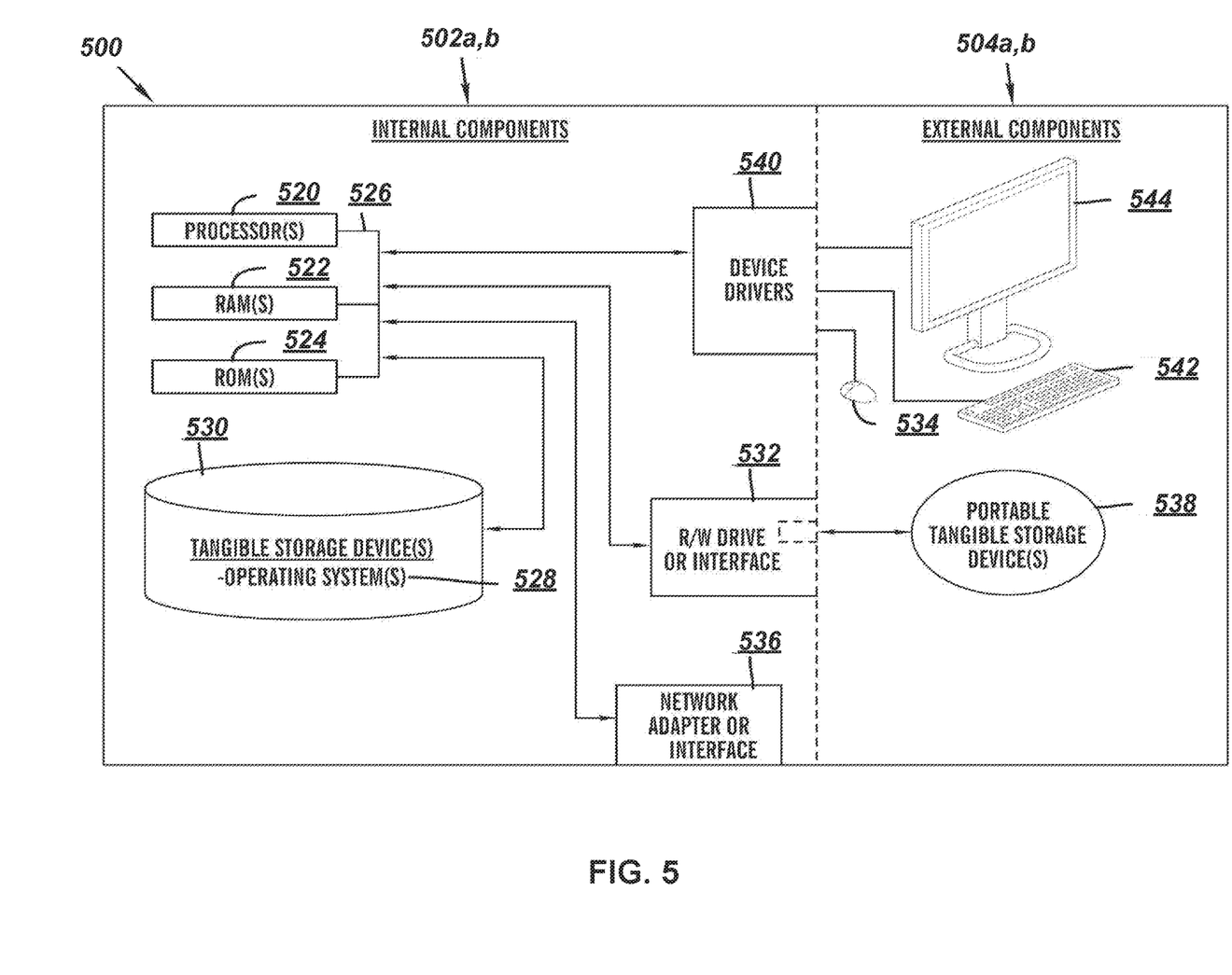
FIG. 5 is a block diagram of internal and external components of computers and servers depicted in FIG. 1 according to at least one embodiment.

FIG. 5 is a block diagram 500 of internal and external components of the client computing device 110 and the server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 502 *a,b* and external components 504 *a,b* illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, the Context Graph Analytics Program 112A (FIG. 1) in the client computing device 110 (FIG. 1), and the Context Graph Analytics Program 112B (FIG. 1) in the server 120 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the Context Graph Analytics Program 112A, 112B (FIG. 1), can be stored on one or more of the respective portable computer-readable tangible storage devices 538, read via the respective R/W drive or interface 532 and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The Context Graph Analytics Program 112A (FIG. 1) in the client computing device 110 (FIG. 1) and the Context Graph Analytics Program 112B (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 536. From the network adapters or interfaces 536, the Context Graph Analytics Program 112A (FIG. 1) in the client computing device 110 (FIG. 1) and the Context Graph Analytics Program 112B (FIG. 1) in the server 120 (FIG. 1) are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
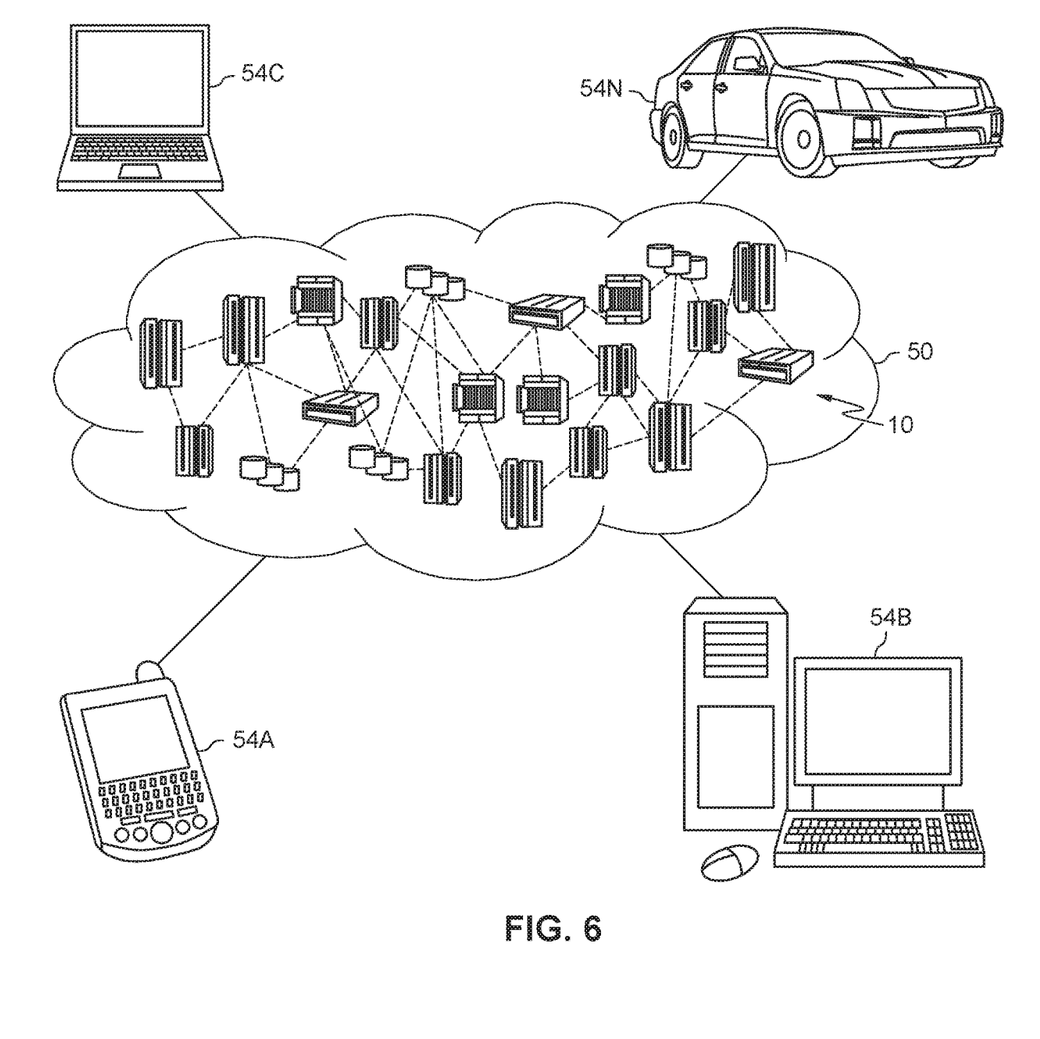
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
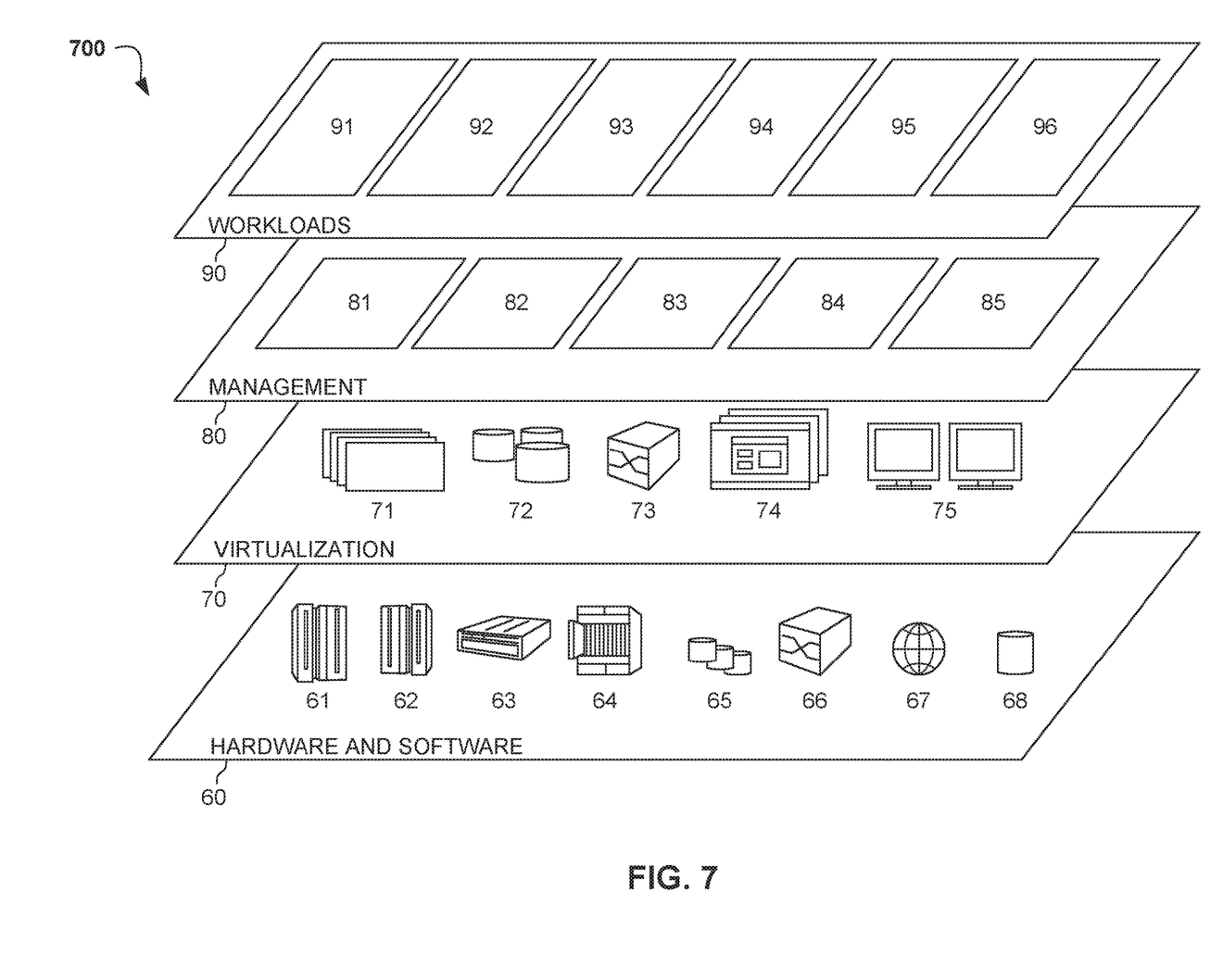
FIG. 7 depicts abstraction model layers according to an embodiment of the present invention.

Referring now to FIG. 7 a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analytics context graph generation 96. Analytics context graph generation 96 may relate to generating a context graph of message or conversation addressees based on extracted user message details.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for generating a context graph, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a user request to initiate generation of team analytics, wherein team analytics comprises generating the context graph and drafting a subsequent message;
   extracting information from a plurality of message details from a message received by the user in an account associated with the user within a networking application, wherein the networking application blends an email system, an instant messaging system, a calendar, a video chat system, and a social networking system into a single solution, wherein the plurality of message details includes a group of a plurality of addressees to which the message is addressed, and wherein the group is extracted as an individual entity and treated as such when creating the context graph;
   determining a message subject based on the extracted plurality of message details, wherein unrelated message text from prior messages is removed from analysis when determining the message subject, wherein the unrelated messages are not related to the message subject;
   determining the extracted plurality of message detail is insufficient to determine the message subject;
   extracting additional message detail from an account associated with one of the plurality of addresses;
   identifying a seed graph based on the determined message subject, wherein the seed graph is a pre-generated, unpopulated graph of independent elements relating to the message subject based on both likely addresses of additional users associated with the message subject and message subject key words, wherein the seed graph comprises specific language based on the message subject;
   retrieving a plurality of addressee data based on the extracted plurality of message details;
   creating the context graph using the identified seed graph and the retrieved plurality of addressee data;
   determining a status of the message subject; and
   preparing a next step seed graph based on the determined status of the message subject, wherein the next step seed graph comprises both a next plurality of addressee data for inclusion in the subsequent message and a draft of the subsequent message.

2. The computer system of claim 1, wherein the networking application comprises at least one of an email system, an asynchronous social networking system, a synchronous social networking system, an instant messaging system, and a wiki.

3. The computer system of claim 1, further comprising:
activating a data analytics function of the networking application associated with a user based on at least one of a plurality of user interactions with a graphical user interface and a satisfaction of a plurality of user preconfigured criteria, wherein the plurality of user preconfigured criteria includes determining a plurality of new addressees with whom a user has never previously communicated exceeds a threshold value and a user familiarity with a plurality of message addressees.

4. The computer system of claim 1, wherein the extracted plurality of message details comprises a plurality of text selected from a group comprising a subject field, a message body field, a "TO:" field, a carbon copy field, a blind carbon copy field, a domain list, a distribution list, and an attachment field within a current message or a prior message.

5. The computer system of claim 1, wherein determining the message subject further comprises:
utilizing a plurality of user personal data, a plurality of user social data, and a plurality of user organizational data within at least one of the networking application or another networking application associated with the user to determine the message subject.

6. The computer system of claim 1, wherein identifying the seed graph comprises at least one of searching a repository and generating the seed graph using a plurality of accumulated message data associated with the networking application.

7. The computer system of claim 1, wherein the plurality of addressee data is retrieved from at least one of a social network and a corporate employee directory using a social path application programming interface, and wherein the retrieved addressee data comprises at least one of a plurality of addressee relationships, a plurality of reporting structure data, and a plurality of profile data, and wherein the plurality of profile data comprises at least one of a plurality of contexts, a plurality of current employee roles, a plurality of employee job titles, a plurality of prior authored updates, and a plurality of user generated content.

8. The computer system of claim 1, wherein retrieving the plurality of addressee data comprises identifying a plurality of message addressees, and wherein creating the context graph further comprises:
mapping each of the identified plurality of message addressees to a corresponding seed graph element; and
creating a plurality of connection lines between a plurality of related seed graph elements based on the retrieved plurality of addressee data.

9. A computer program product for generating a context graph, the computer program product comprising:
one or more computer-readable tangible storage medium and program instructions stored on at least one of the one or more tangible storage medium, the program instructions executable by a processor, the program instructions comprising:
program instructions to receive a user request to initiate generation of team analytics, wherein team analytics comprises generating the context graph and drafting a subsequent message;
program instructions to extract information from a plurality of message details from a message received by the user in an account associated with the user within a networking application, wherein the networking application blends an email system, an instant messaging system, a calendar, a video chat system, and a social networking system into a single solution, wherein the plurality of message details includes a group of a plurality of addressees to which the message is addressed, and wherein the group is extracted as an individual entity and treated as such when creating a context graph;
program instructions to determine a message subject based on the extracted plurality of message details, wherein unrelated message text from prior messages is removed from analysis when determining the message subject, wherein the unrelated messages are not related to the message subject;
program instructions to determine the extracted plurality of message detail is insufficient to determine the message subject;
program instructions to extract additional message detail from an account associated with one of the plurality of addresses;
program instructions to identify a seed graph based on the determined message subject, wherein the seed graph is a pre-generated, unpopulated graph of independent elements relating to the message subject based on both likely addresses of additional users associated with the message subject and message subject key words, wherein the seed graph comprises specific language based on the message subject;
program instructions to retrieve a plurality of addressee data based on the extracted plurality of message details;
program instructions to create the context graph using the identified seed graph and the retrieved plurality of addressee data;
program instructions to determine a status of the message subject; and
program instructions to prepare a next step seed graph based on the determined status of the message subject, wherein the next step seed graph comprises both a next plurality of addressee data for inclusion in the subsequent message and a draft of the subsequent message.

10. The computer program product of claim 9, wherein the networking application comprises at least one of an email system, an asynchronous social networking system, a synchronous social networking system, an instant messaging system, and a wiki.

11. The computer program product of claim 9, further comprising:
program instructions to activate a data analytics function of the networking application associated with a user based on at least one of a plurality of user interactions with a graphical user interface and a satisfaction of a plurality of user preconfigured criteria, wherein the plurality of user preconfigured criteria includes determining a plurality of new addressees with whom a user has never previously communicated exceeds a threshold value and a user familiarity with a plurality of message addressees.

12. The computer program product of claim 9, wherein the extracted plurality of message details comprises a plurality of text selected from a group comprising a subject field, a message body field, a "TO:" field, a carbon copy field, a blind carbon copy field, a domain list, a distribution list, and an attachment field within a current message or a prior message.

13. The computer program product of claim 9, wherein determining the message subject further comprises:
  utilizing a plurality of user personal data, a plurality of user social data, and a plurality of user organizational data within at least one of the networking application or another networking application associated with the user to determine the message subject.

14. The computer program product of claim 9, wherein identifying the seed graph comprises at least one of searching a repository and generating the seed graph using a plurality of accumulated message data associated with the networking application.

15. The computer program product of claim 9, wherein the plurality of addressee data is retrieved from at least one of a social network and a corporate employee directory using a social path application programming interface, and wherein the retrieved addressee data comprises at least one of a plurality of addressee relationships, a plurality of reporting structure data, and a plurality of profile data, and wherein the plurality of profile data comprises at least one of a plurality of contexts, a plurality of current employee roles, a plurality of employee job titles, a plurality of prior authored updates, and a plurality of user generated content.

16. The computer program product of claim 9, wherein retrieving the plurality of addressee data comprises identifying a plurality of message addressees, and wherein creating the context graph further comprises:
  mapping each of the identified plurality of message addressees to a corresponding seed graph element; and
  creating a plurality of connection lines between a plurality of related seed graph elements based on the retrieved plurality of addressee data.

\* \* \* \* \*